United States Patent [19]
Löffler et al.

[11] Patent Number: 5,662,044
[45] Date of Patent: Sep. 2, 1997

[54] OFFSET PRINTING METHOD

[75] Inventors: Gerhard Löffler, Walldorf; Rudolf Karl Uhrig, Schriesheim, both of Germany

[73] Assignee: Heidelberger Druckmaschinen AG, Heidelberg, Germany

[21] Appl. No.: 606,999

[22] Filed: Feb. 26, 1996

[30] Foreign Application Priority Data

Feb. 24, 1995 [DE] Germany ............ 195 06 425.9

[51] Int. Cl.⁶ .................................. B41F 13/00
[52] U.S. Cl. ............ 101/492; 101/211; 101/142; 101/365; 364/527; 364/551.01
[58] Field of Search .................... 101/492, 211, 101/483, 171, 174, 183, 142, 365; 364/551.01, 526, 558

[56] References Cited

U.S. PATENT DOCUMENTS

| | | | |
|---|---|---|---|
| 4,655,135 | 4/1987 | Brovman ................ | 101/483 |
| 4,656,941 | 4/1987 | Brovman ................ | 101/483 |
| 4,717,954 | 1/1988 | Fujita et al. ............. | 101/211 |
| 4,784,060 | 11/1988 | Weisgerber et al. ..... | 101/483 |
| 4,852,485 | 8/1989 | Brunner ................. | 101/211 |
| 4,998,472 | 3/1991 | Rodi et al. .............. | 101/483 |
| 5,029,526 | 7/1991 | Kipphan et al. . | |
| 5,068,810 | 11/1991 | Ott ...................... | 101/211 |
| 5,069,124 | 12/1991 | Schneider . | |
| 5,122,977 | 6/1992 | Pfeiffer ................. | 101/211 |
| 5,163,368 | 11/1992 | Pensavecchia et al. . | |
| 5,170,711 | 12/1992 | Maier et al. ............ | 101/483 |
| 5,212,546 | 5/1993 | Arazi et al. . | |
| 5,295,434 | 3/1994 | Machiil et al. ......... | 101/483 |
| 5,365,847 | 11/1994 | Pers . | |

FOREIGN PATENT DOCUMENTS

| | | |
|---|---|---|
| 0 442 322 | 10/1994 | European Pat. Off. . |
| 36 14 555 | 11/1987 | Germany . |
| 39 25 533 | 2/1991 | Germany . |
| 40 04 056 | 8/1991 | Germany . |
| 31 10 557 | 4/1993 | Germany . |

*Primary Examiner*—Eugene H. Eickholt
*Attorney, Agent, or Firm*—Herbert L. Lerner; Laurence A. Greenberg

[57] ABSTRACT

Offset printing method wherein ink in the form of screened half-tone dots or pixels and unscreened printing-image elements is applied to a printing surface of a recording medium by means of a printing device; a printing form being generated from signals reproducing a printed image; the printing form being inked with an inking device; and the ink being transferred to the printing surface, upon transport of the recording medium relative to the printing device; the signals being processed in a control device for the printing device; includes, near the printing device and before the printing form is generated on a screen or monitor, forming a copy of the printed image from the signals reproducing the printed image and from signals containing parameters of the printing device; whenever the copy deviates from a desired printed image, manually inputting correction values for local inking into the control device, until the copy corresponds to the desired printed image; and generating the printing form and adjusting the elements affecting the inking with the signals reproducing the desired printed image and from signals containing fixed printing-press characteristics.

1 Claim, 3 Drawing Sheets

OFFSET PRINTING METHOD

BACKGROUND OF THE INVENTION

Field of the Invention

The invention relates to an offset printing method by which a printing form is produced from digital signals and in which, after the printing form is inked, a printed image formed of dot-matrix or screen pixels or half-tone dots is generated on a recording medium.

In conventional offset printing presses, inking can be affected by the variation in the thickness of the layer of ink produced on the printing surface of the recording medium. In offset printing presses with an ink duct roller, for example, the width of an ink strip on the ink duct roller can be varied and, as a result thereof, the volume of ink required in the offset printing press varies over the entire width of the printed image. For effecting a zonal or zonewise correction of the inking or ink feeding, inking devices with adjusting elements can be provided, which vary the thickness of the ink film or layer in zones transverse to the printing direction.

These variations in the thickness of the ink film or layer have a uniform effect over the entire length of the print. A local correction of the inking which would affect only certain regions of the printed image is not possible with such offset printing presses.

In offset printing presses wherein the instant of time at which lateral distribution may commence is variable, it is possible to achieve changes in coloration in the printing direction or circumferential direction (note published German Patent Documents DE 36 14 555 A1 and DE 40 04 056 A1). By varying the onset time of the lateral distribution, shifts in the extent of thickness of the ink layer occur over the entire width of the printed image. The application of such methods is limited to special cases, such as the printing of copies produced from one sheet, for example.

It has indeed become possible heretofore to exert an influence upon the inking or ink feeding in the production of the printed image when the printing form is being made. During the production of the printing form, methods known as "computer to plate" or "computer to press" take into account standardized printing characteristics, which describe the increase in tonal value in offset printing, and uniform ink layer thicknesses, in order to obtain half-tone images by means of dots of different sizes having a mutually equal spacing, or dots of equal size having a different spacing therebetween. By this method, printing forms are produced which are based on standardized parameters, i.e., parameters referred to a standard offset printing press. A conventional or usual offset printing press has characteristics, such as the increase in tonal value thereof, for example, which differ from these standardized parameters. The cause of these deviations may be the use of printing inks or rubber blankets other than those which are provided in the establishment of the standardized parameters, or the existence of temperature and humidity values which differ markedly from average values. Furthermore, the aforementioned ink corrections affect the ink layer thickness, which contradicts the assumption that the printing forms are produced with an ink layer or film of uniform thickness. The variation in the aforementioned parameters in the production of the printing form is not suitable for varying the inking or ink feeding dot by dot or regionally.

In generating printed images with the aid of a computer, it has become known heretofore to display the printed image with high resolution on a screen of a size which is as close as possible to the format to be printed. The generated images can be varied arbitrarily interactively with image processing or imaging programs and can be visually inspected by so-called soft proofing; a desired version of the images can then be stored in memory in the form of digital image data. The digital image data can be used directly in applying images to a printing form carrier, for which purpose the device for generating the printed image can be connected directly to the open or closed-loop control device, which regulates with human intervention or controls fully automatically, of a printing press, at least one image-applying or imaging unit being connected to the open or closed-loop control device.

Despite the possibility of varying the inking or ink feeding dotwise or regionally in the soft proof on the screen, the deviations in the characteristics of a particular offset printing press from those of the aforementioned standard offset printing press are not taken into account herein because, at the instant of time the soft proof is produced, no signals or data regarding such deviations are available.

U.S. Pat. No. 5,163,368 shows an offset printing press which operates in accordance with the "computer to press" principle. When individual pixels are generated on the printing form carrier due to removal by laser beam or electro-erosion, the cyclical mechanical errors of the printing device itself are taken into account. In this regard, test print-outs are produced with a test plate which includes a test pattern, and deviations in the position of pixels from the theoretical ideal position are ascertained on these test print-outs. These coordinate-dependent deviations are stored in memory and are taken into account in the correction of the coordinates of the pixels which are to be generated on a printing form carrier. The image applying or imaging unit is thus calibrated with respect to the coordination of the pixels before the imaging is performed.

In the foregoing method, no errors based on cyclical mechanical errors of the offset printing press are present in the printed image. More extensive corrections in inking or ink feeding which involve specific regions in the printed image and take into account the aforementioned print-specific characteristics are not considered in the foregoing reference.

In offset printing, it is a conventional practice for a customer to evaluate the print quality after test copies have been printed on the offset printing press, and then to approve the production or print run. Inking corrections can be made by adjusting the elements which affect the inking or ink feed. However, this is costly both in time and material, because such ink corrections cannot be evaluated until after about 100 copies have been printed and, as a rule, after several correction steps have been performed. Moreover, dotwise correction cannot be performed. As a substitute therefor, test copies or proofs can be made relatively quickly and inexpensively for evaluating the printing results. Disadvantageously, however, they are produced with different types of printing equipment, so that the proofs differ in color from copies made in the offset printing press, and thus mistakes in the evaluation of the print quality result.

SUMMARY OF THE INVENTION

It is accordingly an object of the invention to provide an offset printing method by which the quality of the printing is improved, and the time and expense required for attaining a desired printed image is reduced.

With the foregoing and other objects in view, there is provided, in accordance with the invention, an offset printing method wherein ink in the form of screened half-tone dots or pixels and unscreened printing-image elements is applied to a printing surface of a recording medium by means of a printing device, a printing form being generated from signals reproducing a printed image; the printing form is inked with an inking device; and the ink is transferred to the printing surface, upon transport of the recording medium relative to the printing device; the signals are processed in a control device for the printing device, which comprises, near the printing device and before the printing form is generated on a screen or monitor, forming a copy of the printed image from the signals reproducing the printed image and from signals containing parameters of the printing device; whenever the copy deviates from a desired printed image, manually inputting correction values for local inking into the control device, until the copy corresponds to the desired printed image; and generating the printing form and adjusting the elements affecting the inking with the signals reproducing the desired printed image and from signals containing fixed printing-press characteristics.

The invention thus permits the signals or data which reproduce a printed image to be varied purposefully prior to the image application or imaging so that when the printing form is made, existing transfer characteristics, in particular, tonal-value increase characteristics and characteristics or features of the printing press which is being used are taken into consideration. The varied signals can moreover be used in calculating and adjusting ink distributing devices, dampening devices in offset printing presses, powder applicators, and other devices. It also becomes possible with this method to vary the inking or ink feeding and the ink layer or film thickness of arbitrary sections of the printed image and of sections thereof of arbitrary size.

Other features which are considered as characteristic for the invention are set forth in the appended claims.

Although the invention is illustrated and described herein as an offset printing method, it is nevertheless not intended to be limited to the details shown, since various modifications of the method and structural changes of the equipment for performing the method may be made without departing from the spirit of the invention and within the scope and range of equivalents of the claims.

The construction and method of operation of the invention, however, together with additional objects and advantages thereof will be best understood from the following description of specific embodiments when read in connection with the single figure of the drawing, in which:

DESCRIPTION OF THE PREFERRED EMBODIMENTS

Figure 1:
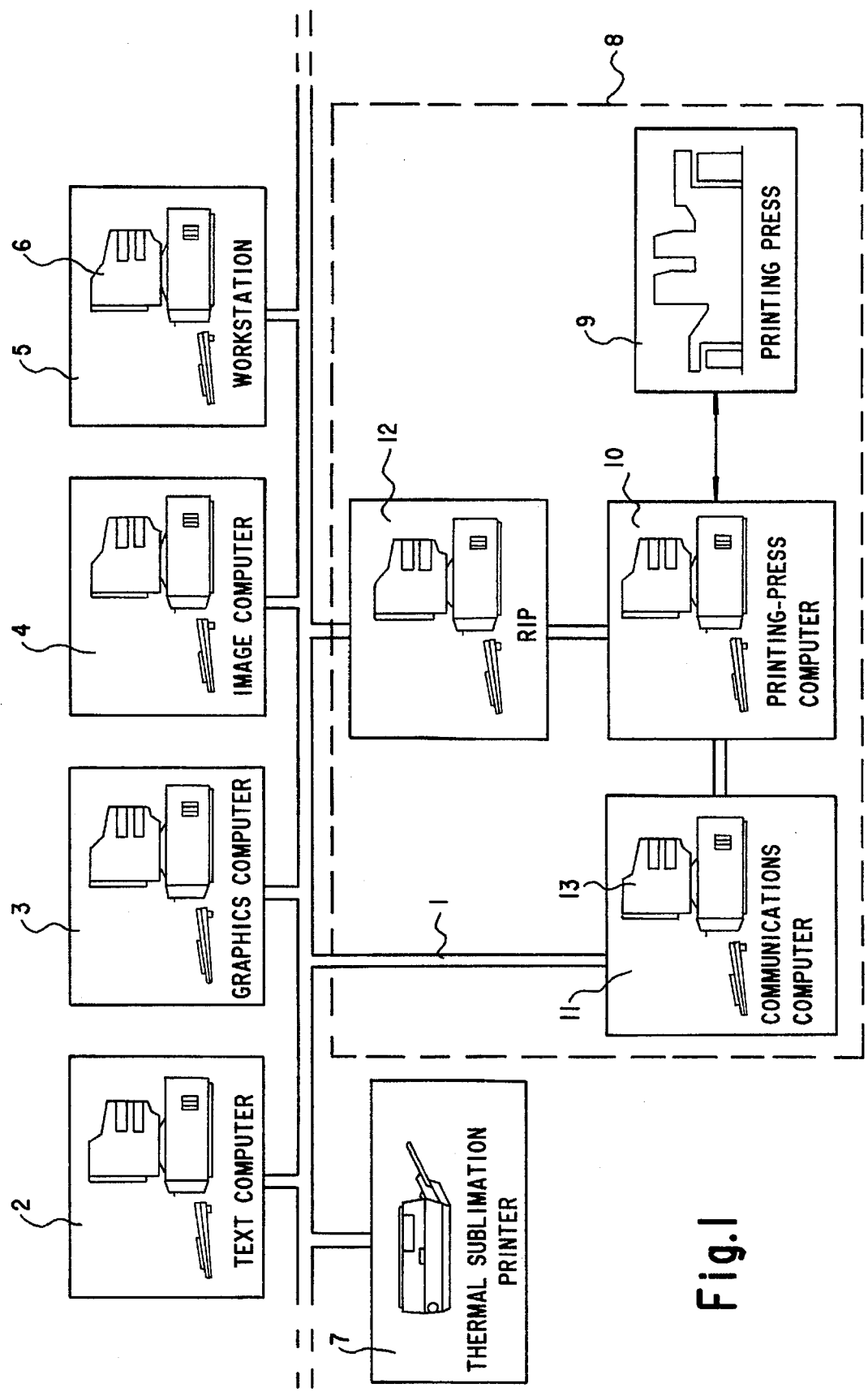
FIG. 1 is a block diagram of the various components of the system for performing the offset printing method according to the invention.

Referring now to the single figure of the drawing, there are shown therein various computers, which are connected to a local-area network 1. Text, graphics and images, respectively, are generated with the aid of a text computer 2, a graphics computer 3, and an image computer 4. Text and graphics, respectively, can be produced by commercially available word processing programs and graphics programs.

Images can be scanned with a flat-bed or drum-type scanner from an original or a copy, and the images can be processed subsequently in the image computer 4. Text, graphics and images can be combined into a printed image at a work station 5. For this operation, commercially available programs are again able to be used. The data for the printed image, for example, for a paper sheet, are available in the memory of the work station 5 in the form of a Postscript file. The functions of the text computer 2, the graphics computer 3 and the image computer 4 can also be taken over by the work station 5. The finished image which has been created is evaluated by means of a video screen or monitor 6 connected to the work station 5, or from a printout on a conventional thermal sublimation printer 7 which is connected to the local-area network 1. In this step of the operation, changes in the printed image for effecting a fine correction can still be performed.

In a printshop 8, an offset printing press 9 with a printing-press computer 10, which is connected to a communications computer 11 and a dot-matrix or raster image processor (RIP) 12, each of the computers 11 and 12 being, in turn, connected to the local-area network 1.

The finished Postscript file for the printed image is loaded into the memory of the communications computer 11. The image to be printed is shown on a monitor 13 connected to the communications computer 11.

The data of the Postscript file are combined with data which take press-specific and method-specific characteristics of the offset printing press 9 into account. The printed image shown on the screen 13 differs from the printed image which was generated on the screen 6 in the pre-press stage. The printed image shown on the screen 13 simulates the print outcome or result anticipated on the offset printing press 9 which is being used. The data which contain the press-specific and method-specific characteristics are either already available in the memory of the printing-press computer 10 or are retrieved by the printing-press computer 10 with the aid of sensors in the offset printing press 9, and transferred to the communications computer 11. To represent the anticipated print outcome, the communications computer 11 contains programs corresponding to those for image processing in the image computer 4. The printed image can be corrected once again, also locally, in the communications computer 11, before being printed. The printing-press specific and the method-specific and, if necessary or desirable, color-related data for the printed image, which are corrected by inputs, are converted in the dot-matrix image processor 12 into a bit map for each of the printing forms to be produced in the offset printing press 9. The bit map of a printing form contains information regarding the position and size of the screen dots and other printing elements on a printing form carrier. With the aid of the printing-press computer 10, the bit maps are used in a conventional manner for controlling imaging or image-applying units which are associated with or assigned to a printing form cylinder in the offset printing press 9. Furthermore, adjustments to be made in an inking device, a device for metering dampening medium or solution, a powder applicator, a dryer and other devices of the offset printing press 9 are also calculated from the bit maps in the dot matrix image processor 12 and performed with the aid of the printing-press computer 10.

Figure 2:
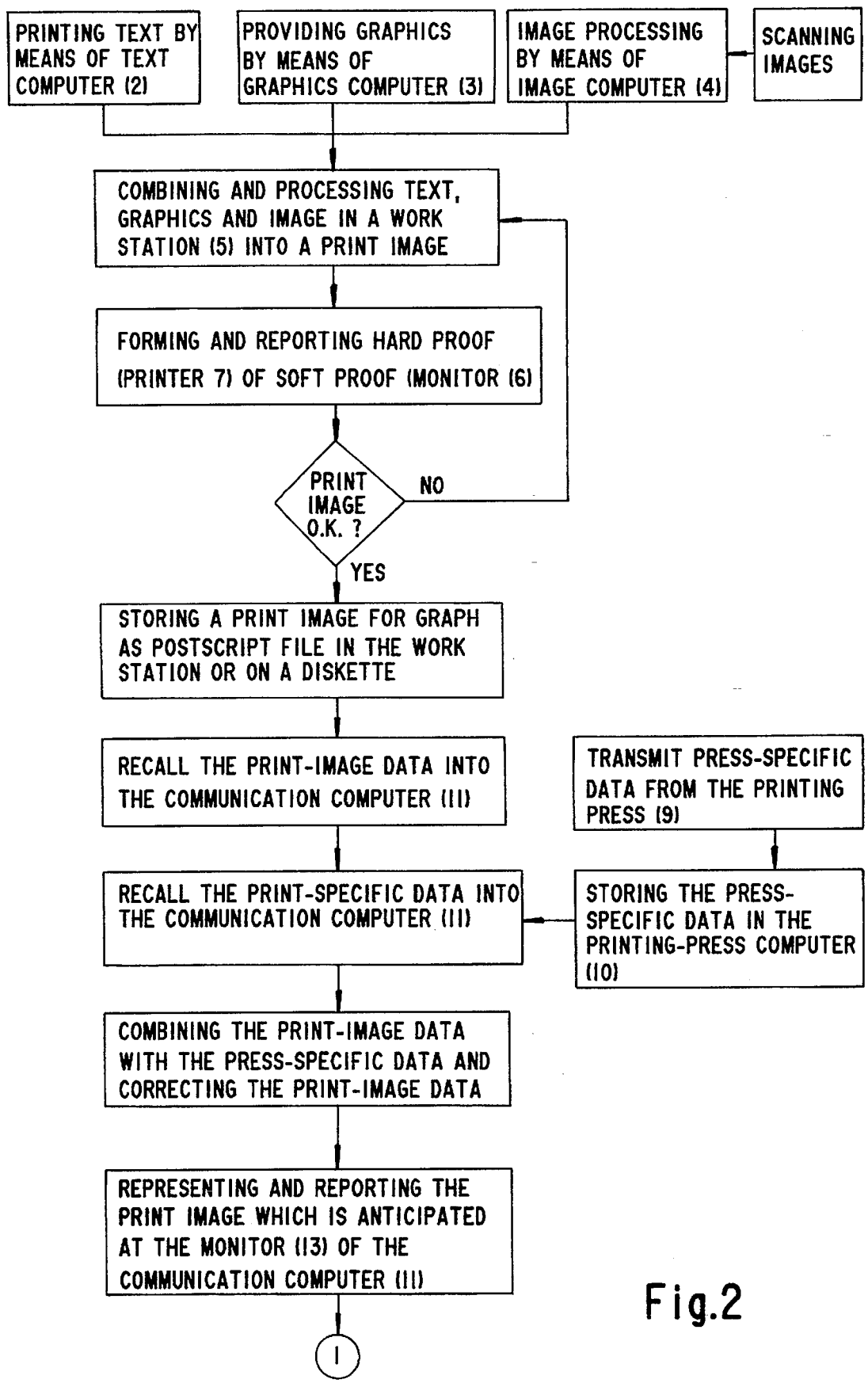
FIGS. 2 and 3 are a flow chart of the steps for performing the mode of the offset printing method described in the specification herein.
Figure 3:
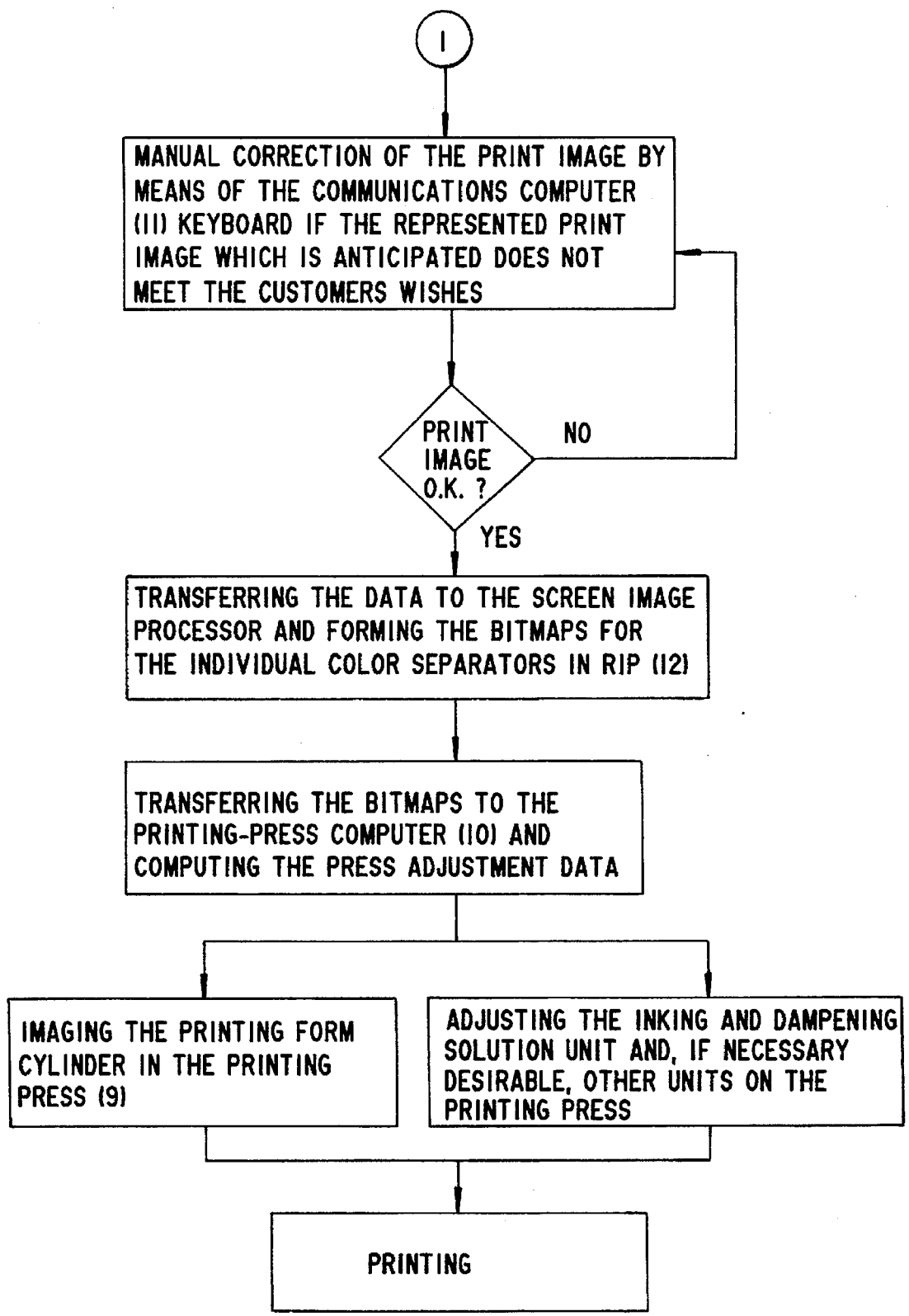

The foregoing description of the various steps for performing the offset printing press according to the invention is illustrated in the flow chart of FIGS. 2 and 3.

We claim:

1. Offset printing method wherein ink in the form of screened half-tone dots or pixels and unscreened printing-image elements is applied to a printing surface of a recording medium by means of a printing device; a printing form being generated from signals reproducing a printed image; the printing form being inked with an inking device; and the ink being transferred to the printing surface, upon transport of the recording medium relative to the printing device; the signals being processed in a control device for the printing device; which comprises, near the printing device and before the printing form is generated on a screen or monitor, forming a copy of the printed image from the signals reproducing the printed image and from signals containing parameters of the printing device; whenever the copy deviates from a desired printed image, manually inputting correction values for local inking into the control device, until the copy corresponds to the desired printed image; and generating the printing form and adjusting the elements affecting the inking with the signals reproducing the desired, printed image and from signals containing fixed printing-press characteristics.

* * * * *